G. W. Bowers,
Garlic Machine.
Nº 7,662.          Patented Sep. 24. 1850.
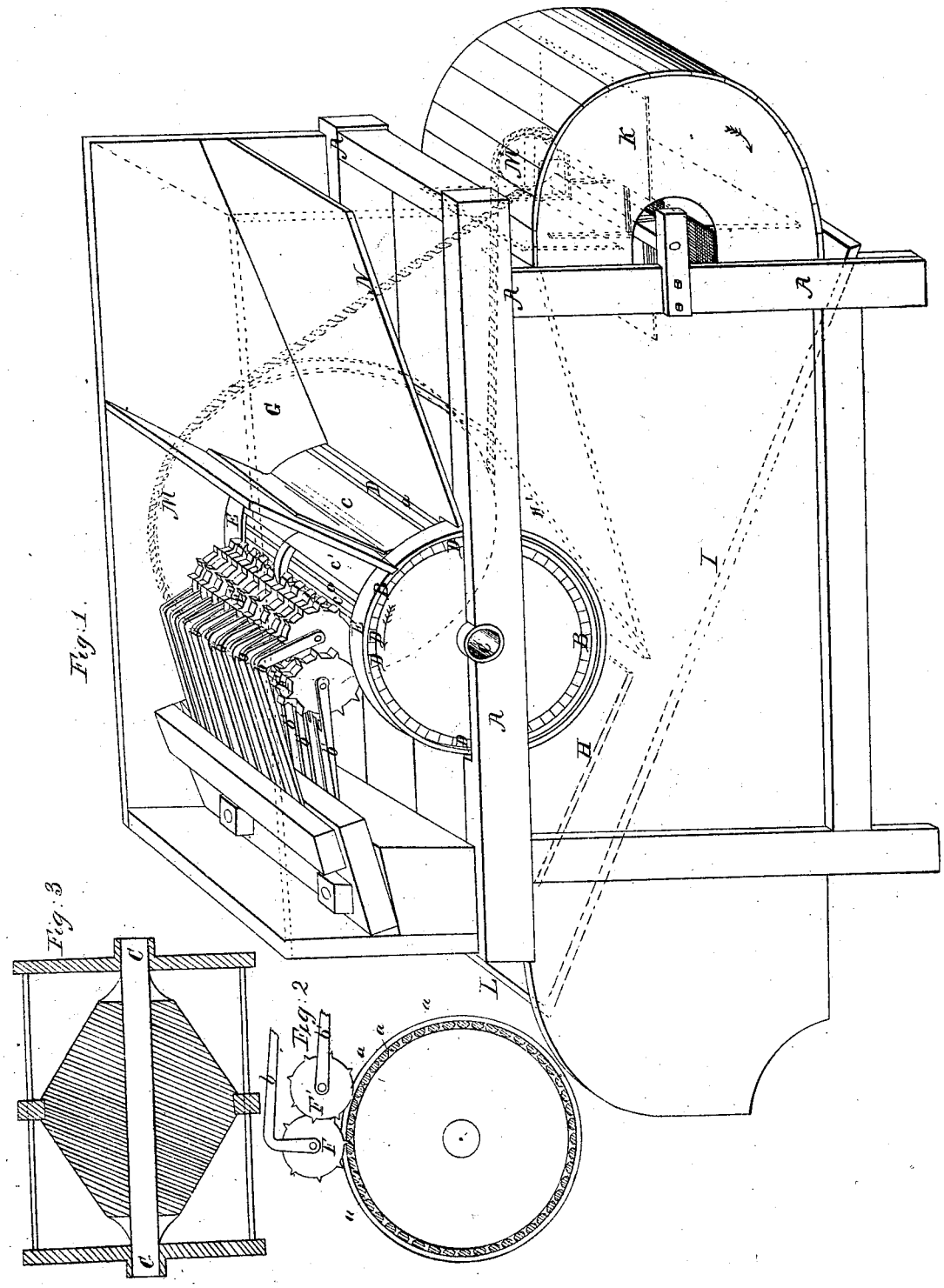

UNITED STATES PATENT OFFICE.

GEO. W. BOWERS, OF LEITERSBURGH, MARYLAND.

GRAIN-CLEANING MACHINE.

Specification of Letters Patent No. 7,662, dated September 24, 1850.

*To all whom it may concern:*

Be it known that I, GEO. W. BOWERS, of Leitersburgh, in the county of Washington and State of Maryland, have invented a new and Improved Machine for Cleaning Grain, particularly applicable to the separation of garlic from wheat; and I do hereby declare that the following is a full, clear, and exact description of the same, reference being had to the accompanying drawing, forming part of this specification, in which—

Figure 1 is a perspective view of my garlic machine with the top and one side of the barrel case removed. Fig. 2 is a transverse section through the barrel, and Fig. 3 a longitudinal section of the same.

My invention is based on the fact that garlic is softer and can be much more easily compressed than sound wheat with which it is mixed. I therefore present the wheat to be cleaned to the face of a revolving barrel formed of staves having flaring slots between them sufficiently large at the outer faces of the staves to receive the grain but small enough at the inner faces of the staves to prevent its passage between them. The grain in the slots is subjected to the pressure of the teeth of one or more series of wheels, by the action of which the smutty grains are crushed, and the garlic compressed and pushed through the narrow opening of the slots into the hollow center of the barrel, and discharged through openings in its head at the side of the machine. By the revolution of the barrel the good wheat is discharged from the flaring mouths of the slots into a funnel beneath the barrel from which it is delivered in a thin sheet upon an inclined plane down which it runs to be discharged from the machine, during the delivery of the grain from the funnel and its passage down the inclined plane, it is subjected to a strong current of air produced by a fan attached to the machine, and all dust and dirt are expelled.

In the drawing, A is the general frame work of the machine, on it is mounted the barrel B, this barrel is hollow and has openings C in its head through which the compressed garlic is discharged, the cylindrical surface of the barrel is formed of staves D hooped together on the heads of the barrel by the bands E, the staves between the hoops have the cross section represented in Fig. 2, thus forming flaring slots $a$ in which the grain is received. The barrel is revolved in the direction indicated by the arrow, above it are the two sets (F, F',) of toothed wheels, resembling ordinary cog wheels, the teeth of these wheels correspond with the flaring slots between the staves of the barrel, and the spaces between the teeth are equal to the width of the staves. Each wheel revolves on an axis attached to a forked spring ($b$, $b'$) which embraces the wheel, and by which the requisite pressure is obtained, and in order that all the grain in the slots $a$ between the staves may be acted upon, the second set of toothed wheels run in the spaces left between the wheels of the first set. The grain is fed at the hopper G, and is received in the slots in the barrel, where it is held by aprons of leather ($c$, $c'$), until it comes under the toothed wheels. By the action of the teeth on the grain in the spaces $a$ of the revolving barrel, the garlic and smutty grains, are forced through the narrow opening between the inner edges of the staves, and are discharged at the side of the machine through the openings C, in the barrel head; while the sound wheat being incompressible by the springs remains in the slots, and is carried on by the revolution of the wheel until it falls on the planes H, H, inclined to each other and forming a funnel from which the grain is delivered on the plane I inclined toward the fan K. During its delivery, and its passage down the inclined plane I, the dust and dirt are blown out at the opposite extremity L of the machine, and the grain is discharged in a perfectly clean state beneath the fan case. In order to facilitate the discharge of the garlic the spindle within the barrel is made conical, so that the seeds which pass through may be more easily discharged by passing down the inclined surface of the cone. The driving power is applied directly to the barrel B, and from it by the pulleys M, M', and belt N, to the fan K.

My garlic machine has a great advantage over all others of the same class in being extremely simple in the arrangement of all its parts, there being no complex gearing to impede its action or increase its cost, while at the same time it perfectly accomplishes the object for which it was devised; viz, the perfect separation of garlic from wheat.

What I claim as my invention and desire to secure by Letters Patent is—

The combination of the revolving slotted hollow barrel (B) with the toothed wheels (F, F') the same being arranged and operated substantially in the manner and for the purpose herein set forth.

In testimony whereof I have hereunto signed my name.

GEO. W. BOWERS.

In presence of—
P. H. WATSON,
WILLIAM G. ANIBEE.